United States Patent [19]

Detroit

[11] 4,447,339

[45] May 8, 1984

[54] OIL WELL DRILLING CLAY CONDITIONERS AND METHOD OF THEIR PREPARATION

[75] Inventor: William J. Detroit, Schofield, Wis.

[73] Assignee: Reed Lignin, Inc., Greenwich, Conn.

[21] Appl. No.: 277,714

[22] Filed: Jun. 26, 1981

[51] Int. Cl.$^3$ .................................................. C09K 7/02
[52] U.S. Cl. .............................. 252/8.5 A; 252/8.5 C; 252/8.5 B; 260/124 R
[58] Field of Search .............. 252/8.5 A, 8.5 B, 8.5 C; 260/124 R

[56] References Cited

U.S. PATENT DOCUMENTS

| | | | |
|---|---|---|---|
| 2,393,166 | 1/1946 | Hoeppel | 252/8.5 B |
| 2,529,760 | 11/1950 | Bergman | 252/8.5 B |
| 2,935,473 | 5/1960 | King et al. | 260/124 |
| 3,138,555 | 6/1964 | King et al. | 252/8.5 C |
| 3,168,511 | 2/1965 | King et al. | 252/8.5 C |
| 3,244,623 | 4/1966 | King et al. | 252/8.5 C |
| 3,271,382 | 9/1966 | Quimby et al. | 260/124 |
| 3,448,096 | 6/1969 | Read | 260/124 |
| 3,957,703 | 5/1976 | Ludwig et al. | 260/124 |
| 3,985,667 | 10/1976 | Gray et al. | 252/8.5 C |

FOREIGN PATENT DOCUMENTS

| | | | |
|---|---|---|---|
| 691362 | 7/1964 | Canada | 252/8.5 C |
| 1437902 | 6/1976 | United Kingdom | 252/8.5 A |
| 663711 | 5/1979 | U.S.S.R. | 252/8.5 B |

*Primary Examiner*—Benjamin R. Padgett
*Assistant Examiner*—Howard J. Locker

[57] ABSTRACT

Drilling fluid additives are prepared by oxidation of sulfonated lignin-containing materials with manganese dioxide under highly acidic conditions to make manganese lignosulfonates. Additional improvements in the rheological properties of the additives may be obtained by complexing the manganese lignosulfonate so obtained with a heavy metal cation (preferably iron or copper), by, for example, addition of ferrous sulfate or ferric sulfate to the manganese lignosulfonate. These products show the requisite combination of rheological properties for a satisfactory drilling fluid additive or conditioner.

27 Claims, No Drawings

OIL WELL DRILLING CLAY CONDITIONERS AND METHOD OF THEIR PREPARATION

FIELD OF INVENTION

This invention relates to drilling fluid additives or conditioners and is specifically related to such additives or conditioners which are chromium-free.

In one aspect, the present invention relates to drilling fluid additives or conditioners prepared by oxidation of sulfonated lignin-containing materials with manganese dioxide to make manganese lignosulfonates.

In another aspect, this invention is concerned with drilling fluid additives or conditioners prepared by oxidation of sulfonated lignin-containing materials with manganese dioxide to make manganese lignosulfonates followed by complexing the manganese lignosulfonates with a heavy metal cation (preferably iron or copper) to form manganese heavy metal cation-complexed lignosulfonates.

The present invention also discloses methods of making manganese lignosulfonates and manganese-heavy metal cation-complexed lignosulfonates.

BACKGROUND OF INVENTION

It is a matter of common experience in the oil and gas industry that the drilling of oil or gas wells is carried out with the aid of a circulating drilling mud or drilling fluid. As mentioned in U.S. Pat. No. 3,035,042, issued on May 15, 1962 to Charles H. Hoyt, the circulating drilling fluid serves to cool and lubricate the drill; remove and transport drill cutting to the surface; help the drill bit perform by its hydraulic action; cement or seal the walls of the drill hole; hold the drill cuttings in suspension when drilling is stopped and form a hydrostatic head and thus serve to control the flow of high pressure gas, oil or water.

Also, as disclosed in U.S. Pat. No. 3,076,759, issued to Van Dyke et al. on Feb. 5, 1963, the most commonly used drilling fluids are aqueous dispersions of clay such as bentonite, illite, kaolinite and other similar materials. As mentioned in this patent, for a drilling fluid to be satisfactorily used in the drilling of wells, it must have sufficiently low viscosity so that it can readily carry rock chips which are loosened by the drill bit to the surface, and it must be thixotropic so that when the drilling is discontinued, the fluid will gel and prevent the rock chips from settling around the drill bit. Also, it must have the proper yield point to allow resumed fluid circulation when desired.

Another important property of a satisfactory drilling fluid is its ability to seal the porous formations of the well bore. This property is measured by a standard test commonly referred to as water loss, fluid loss or "wall-building".

It has heretofore been difficult, if not impossible, to obtain a drilling fluid having the aforementioned combination of properties without the use of certain additives. Such additives, in the past, included bentonite, starch, gums, tannins, sodium silicate, etc. More recently, however, modified lignosulfonates derived from spent sulfite liquor have proven to be effective additives for attaining the desired properties in a drilling fluid.

Thus, U.S. Pat. No. 2,953,473 issued to King et al. on May 3, 1960 discloses a drilling fluid composition which is a combination of drilling mud and specially treated sulfonated lignin-containing material. These sulfonated lignin-containing materials are commonly referred to as "drilling fluid additives" or simply "additives", and their inclusion in the drilling mud or the drilling fluid compositions serves to attain the desired properties which were heretofore discussed.

The sulfonated lignin-containing materials described in the aformentioned King et al. patent are derived from spent lignin liquors obtained from the pulping of woods. These sulfonated lignin-containing materials are soluble in the drilling fluid and are highly effective additives in both lime base muds as well as fresh water muds.

In order to improve the effectiveness of the sulfonated lignin-containing materials as drilling fluid additives, King et al. recommend converting the sulfonated lignin-containing material to a salt of iron, chromium, copper and aluminum, or combination of said salts. These sulfonated lignin-containing materials comprising said metallic salts are then subjected to oxidation using various oxidants to be hereinafter described. The oxidation changes the constitution of the sulfonated lignin-containing materials and results in additives having enchanced properties.

Alternatively, King et al. disclose that the sulfonated lignin-containing materials may be oxidized directly regardless of whether the aforementioned salts are first formed.

With regard to the choice of the oxidizing agents, King et al. set forth two criteria; one is the strength and power of the oxidizing agent, and the second is the quantity of the oxidant. The recommended oxidizing agents are those which have a range of oxidation potentials greater than $-1.3$. These oxidants include hydrogen peroxide, ozone, lead dioxide, chromic acid, chlorine, alkali and alkaline eqrth hypochlorite, alkali metal chromate (containing chromium ion), alkali metal permanganate (containing manganese ion), alkali metal persulfate, alkali metal perborate, and electrolytic oxidation.

Other patents of interest by way of general background in this field include U.S. Pat. Nos. 2,935,504; 3,007,864; 3,168,511; 3,634,387; 3,686,119 and 4,220,585.

The principal oxidant in Hoyt's U.S. Pat. No. 3,035,042 is chromium and the additive which is formed is a sulfonated-lignin-iron-chromium complex.

The additive disclosed in the aforementioned patent of Van Dyke et al. is also a chromium complex and is substantially iron-free, water-soluble chromium complex of a lignosulfonate.

Although chromium complexed lignosulfonates have achieved a certain degree of acceptability as drilling fluid conditioners, they are environmentally undesirable due to the poisonous nature of chromium. In fact, in several countries including the U.S.A., legislations have been enacted, are pending, or being considered, prohibiting the use of chromium complexed lignosulfonates due to their adverse impact on the environment.

King et al., in their aforementioned patent, disclose oxidants other than chromium. These patentees also disclose that additives obtained by direct oxidation of lignin-containing materials are less effective than additives obtained by the conversion of the lignin-containing materials to salts, followed by the oxidation of these salts with various oxidants such as those containing the metal ions chromium and manganese which have oxidation potentials greater than $-1.3$. However, conversion of the lignin-containing materials to their salts, followed by the oxidation of the salts involves a cumbersome and costly procedure.

Accordingly, it is an object of this invention to provide a chromium-free lignin-containing material for use as a conditioner or an additive for oil well drilling mud or fluid.

It is another object of this invention to provide such drilling fluid additives by the oxidation of lignosulfonates with manganese dioxide with or without subsequent complexing iron or other complexing cations.

It is also an object of this invention to provide a drilling fluid, having enhanced properties and effectiveness, by direct oxidation of lignosulfonates or sulfonated lignin-containing materials without the intermediate step of conversion of these lignosulfonate materials to their salts.

It is further an object of this invention to provide effective drilling fluid additives by less expensive and less cumbersome procedure than hitherto possible.

The foregoing and other objects of this invention will be more clearly comprehended from the following detailed description of the invention.

SUMMARY OF INVENTION

Sulfonated lignin-containing materials are oxidized with manganese dioxide under highly acidic conditions using a mineral acid such as sulfuric acid to prepare manganese lignosulfonates. The manganese lignosulfonates may be recovered from the mixture and used as drilling fluid additives or conditioners.

Improvement in drilling fluid additive properties may be realized by a method which comprises oxidation of sulfonated lignin-containing materials with manganese dioxide followed by complexing of the resulting manganese lignosulfonates with heavy metal cation such as iron, copper, aluminum, magnesium, zirconium, or combinations thereof.

The resultant additives, whether manganese lignosulfonates or manganese-heavy metal cation-complexed lignosulfonates, when used in combination with drilling fluids, exhibit improved drilling fluid additive properties such as apparent viscosity, yield point, 10-minute gel strength and water loss.

In addition, the additives disclosed herein are chromium-free and have no adverse environmental impact.

DETAILED DESCRIPTION OF INVENTION

It has now surprisingly been discovered that oxidation of sulfonated lignin-containing materials with manganese dioxide ($MnO_2$), which has an oxidation potential of $-1.23$, yields manganese lignosulfonates having highly desirable properties as mud thinners or drilling fluid additives or conditioners. Additional improvements in these rheological properties may be obtained by complexing the manganese lignosulfonates with a heavy metal complexing ion such as iron, copper, etc.

The manganese lignosulfonates obtained by oxidation of sulfonated lignin-containing materials in accordance with the present invention, and the heavy metal ion-complexed manganese lignosulfonates exhibit improved apparent viscosities, yield points and 10 minutes gel strength compared to chromium lignosulfonates. Moreover the so-called "water loss" property of the products of this invention is at least comparable to or better than the water loss associated with the use of chromium lignosulfonates.

Also, and unlike chromium lignosulfonates, the use of manganese lignosulfonates or manganese-heavy metal ion-complexed lignosulfonates of the present invention is not environmentally objectionable since they have no adverse effects upon the environment.

The lignin-containing starting materials which are useful in making the products of this invention are well known and, in general, they are described in the aforementioned King et al. patent. The desired starting lignosulfonates are usually spent lignin liquors obtained from pulping of wood. Lignosulfonates of hardwood or softwood origin, obtained from calcium sulfite spent liquor (SSL from calcium sulfite pulping of wood) provide a particularly desirable source of starting raw material in the practice of this invention. Preferably, these lignosulfonates are treated to remove their reducing sugars by fermentation (alcohol or yeast) or by using calcium bisulfite under high temperature and high pressure. The sugar-destroyed, calcium-based spent sulfur liquors, or the spent sulfite liquor used as the starting raw materials will hereinafter be also referred to generally as "sulfonated lignin-containing materials".

In general, and broadly speaking, the products of this invention are obtained by the oxidation of the sulfonated lignin-containing materials with manganese dioxide under acidic conditions, and recovering the resulting manganese lignosulfonate. Additional improvement in rhelogical properties may be realized by complexing the manganese lignosulfonates with a heavy metal ion, preferably iron or copper, to obtain heavy metal ion-manganese complexed lignosulfonates.

Initially, and optionally, the sulfonated lignin-containing material may be activated by heat treatment with an acid, aldehyde polymerization, oxidation with an oxidizing agent other than manganese dioxide, ultrasonic energy, or a combination thereof. While not wishing to be bound by any particular theory or mechanism, it is believed that this activation step results in the polymerization, i.e., conversion, of the lower molecular weight constituents of the lignosulfonates into higher molecular weight fractions which are better suited for oxidation with manganese dioxide.

Where such activation step is used, mineral acids such as sulfuric acid, nitric acid, phosphoric acid or hydrochloric acid may be effectively employed, with sulfuric acid constituting the preferred mineral acid.

Acid activation may be conviently carried out at a temperature of from about 50° C. to about 100° C. for a period of several minutes, preferably about 10 to about 60 minutes, using from about 0.1 percent to about 0.5 mol percent of acid based on the solids content of the lignosulfonate starting material.

Suitable aldehydes in the activation step include formaldehyde, furfural, benzaldehyde and the like, with formaldehyde constituting the aldehyde of choice.

The oxidizing agents include oxygen, ozone, nitric acid, hydrogen peroxide, etc. Manganese dioxide, however, is not used during this step.

As it was previously mentioned, the sulfonated lignin containing materials may be oxidized directly with manganese dioxide. In this case, it is necessary to add a mineral acid such as anyone of the aforementioned acids, preferably sulfuric acid, so that the oxidation reaction is carried out under highly acidic condition.

Whether the sulfonated lignin-containing starting material is first activated as heretofore described before the oxidation step, or oxidized without prior activation, the amount of acid used can vary from about 10 percent to about 40 percent, preferably from about 15 to about 25 percent, based on the solids content of the lignosulfonates, and depending on the particular lignosulfonate starting material. The addition of the acid, which is preferably sulfuric acid, lowers the pH of the mixture to as low as 1 or even lower.

The amount of manganese dioxide employed also depends on the type of lignosulfonate starting material. This amont can vary from about 3 percent to about 30 percent, preferably from about 8 percent to about 20 percent, based on the solids content of the lignosulfonate starting material.

The manganese dioxide used for the oxidation of the lignosulfonate has an oxidation potential of −1.23 and is generally available and used in powder form at approximately 98 percent purity.

The oxidation of the lignosulfonate with manganese dioxide is carried out under highly acid conditions at atmospheric pressure and a temperature of from about 0° C. to about 80° C. Since this oxidation reaction is highly exothermic, the mixture must be cooled with agitation so that this temperature does not exceed about 80° C., although it is usually preferable to maintain this temperature about 60° to 70° C.

The rate of addition of the manganese dioxide depends on its purity and concentration, the concentration of solids in the lignosulfonate and the effectiveness of agitation. This rate is usually controlled so that the reaction is completed within several minutes to 2 hours, preferably within 30 minutes to 1 hour.

The recovered manganese lignosulfonate made by the oxidation reaction described herein usually contains from about 2 to about 15 percent, preferably from about 4 to about 12 percent equivalent manganese.

The oxidation of sulfonated lignin-containing materials with manganese dioxide as aforesaid yields manganese lignosulfonate which may be recovered from the reaction mixture. When used as drilling fluid additive, manganese lignosulfonate exhibits all the desirable rheological attributes required for a good drilling fluid additive or conditioners. These properties include apparent viscosity, yield point, 10 minutes gel strength and water loss.

After completion of the oxidation reaction, it is generally desirable to adjust the pH of the resulting mixture by the addition of a suitable base such as alkali metal hydroxide or alkaline earth metal hydroxide to raise the pH to about 3.0 to 4.5. These hydroxides include sodium hydroxide, potassium hydroxide, calcium hydroxide and lithium hydroxide.

Due to its low cost, sodium hydroxide constitutes the hydroxide of choice and is usually used in dilute concentrations, e.g., as about 20% solution. The sodium hydroxide is usually added at ambient conditions although it may also be added at the temperature of the mixture upon completion of the oxidation step.

When using sulfuric acid in the activation step, or in the direct oxidation of the sulfonated lignin-containing materials, or when the sulfuric acid is used in combination with other acids, calcium sulfate (gypsum) will precipitate from the mixture. Thus, after the neutralization step, if no neutralization step is necessary, after the oxidation step, the calcium sulfate precipitate must be removed by any of the well known methods which include the use of rotary vacuum filters, centrifugation, filtration, settling, etc.

In one particular aspect of this invention, the filtrate from the previous step containing the manganese lignosulfonate is complexed with a heavy metal cation. Where the ultimate desired product is manganese lignosulfonate, heavy metal complexing is not required particularly when high level of manganese dioxide is used in the oxidation step. However, it has been found that further improvements in drilling fluid additive properties can be realized by complexing the manganese lignosulfonate with a heavy metal cation.

A variety of heavy metal cations may be used for this purpose. These include iron, copper, aluminum, magnesium, zinc and zirconium, with iron and copper constituting the preferred cations.

When complexing with iron is desired, the iron is usually added to the filtrate as iron (ferrous or ferric) sulfate in a quantity which would result in about 5 to about 15 percent, preferably about 7 to about 12 percent iron in the final ferro manganese-complexed lignosulfonate.

Iron (ferrous or ferric) sulfate heptahydrate, chloride, acetate and the like may also be used in the complexing step. When the complexing cation is copper, zinc, or any of the aforementioned cations, they are preferably used as sulfates although the chlorides, acetates or other salts may be used efficaciously.

The final product may be either used as a liquid or it any be spray dried in powder form for use as oil well drilling fluid conditioner or additive.

Whether the final product is manganese lignosulfonate or heavy metal cation (e.g. iron) - manganese-complexed lignosulfonate, it has been found that these products are excellent conditioners when used as additives in oil well drilling fluids. They exhibit the requisite and desirable combination of rheological properties for a satisfactory drilling fluid conditioners.

The following examples will further serve to illustrate the preparation of the products of this invention and their advantageous drilling fluid conditioning properties. It must be understood, however, that these examples are merely illustrative and are not intended to limit the scope of the present invention.

In the following examples, all measurements of apparent viscosity, yield point, gel strength and Fann degree readings were made in accordance with API Recommended Practice 13B, "Standard Procedure For Testing Drilling Fluids", 6th Edition, published by the American Petroleum Institute April 1976.

EXAMPLE I 200 grams of yeast fermented softwood spent sulfite liquor solids as 35% solution in water was heated to 55° C. and treated with 32 grams of 34% sulfuric acid (100%) in water under mechanical agitation. Thereafter, 16 grams of manganese dioxide was added as a 35% slurry suspension in water under continued agitation, while cooling the exothermic reaction mixture to 70° C. After 35 minutes, 16 grams of 100% potassium hydroxide was added as a 45% aqueous solution to adjust the pH of the mixture to 3.5. The calcium sulfate precipitated due to addition of sulfuric acid was filtered and discarded. The filtrate solids recovered were 230 grams as a 31.6% solution. 126.4 grams of the filtrate solids were then heated to 70° C. and 87 grams of ferrous sulfate heptahydrate as solid powder was added and dissolved in the filtrate over a 30-minute period under agitation. The resulting solution of ferro-manganese lignosulfonate was then spray dried at 230° F. to recover solid ferro-manganese lignosulfonate.

The material recovered in this example was evaluated as an additive in a calcium montmorillonite clay system and compared to commercially available chromium lignosulfonate as well as chrome-free lignosulfonate. The comparative results are shown in Table 1 below.

The evaluation test was as follows using aged 28% Panther Creek calcium bentonite prepared in deionized water.

Test Procedure (1) Add 1.75 grams salt to a barrel equivalent (350 cc) of 28% by weight Panther Creek bentonite which has been aged for at least seven days.

(2) Stir for 3 minutes in a Hamilton Beach mixture at 7500±500 rpm.

(3) Add 5 grams of the sample to be tested.

(4) After the sample has been mixed with the mud for 1 minute, add sufficient caustic soda solution (1 ml=0.25 gram NaOH) so that the pH measures 9.5±0.1 after 20 minutes of total stirring time.

(5) The mud is stirred in a Hamilton Beach Model 30 mixer at 7500±500 rpm during this 20 minute stirring time.

(6) Measure initial flow properties.

(7) Hot roll the sample overnight at 150° F.

(8) Cool the samples to room temperature. Readjust the pH to 9.5±0.1 with additional caustic soda solution and stir for 5 minutes before measuring hot roll properties.

(9) Measure the flow properties on Fann Model 35G Meter. Record the values of apparent viscosity (cps), yield point (pounds/100 sq.ft.), Degree Fann readings (600,300,3) and 10-minute gel strength (pounds/100 sq.ft.).

EXAMPLE II

Another 100 gram sample of yeast fermented softwood spent sulfite liquor solids as in Example I was treated with 20.5% of 100% sulfuric acid as a 38% aqueous solution. This mixture was heated to 80° C. for 1 hour and then cooled to 55° C. Thereafter, 12 grams of manganese dioxide was added as a 35% slurry in water over a 10-minute period under agitation, while the exothermic reaction mass was cooled to keep the temperature below 60° C. After agitation for another 10 minutes, the reaction mass was neutralized with 5.3 grams of 100% sodium hydroxide as a 17% aqueous solution to bring the pH up to 3.7. The reaction product was filtered to remove the precipitated calcium sulfate and 124.5 grams of solid filtrate was recovered as a 30.0% aqueous solution. 30 grams of this filtrate solids was treated with 20.6 grams of ferrous sulfate heptahydrate while the mixture was agitated at 58° C. and a pH of 3.0. The final product, which had 10% iron, was spray dried as in Example I and 230° F. inlet temperature and the resulting material (ferro-manganese lignosulfate) was evaluated as in Example I.

The test results of the product of this example is also shown in Table 1.

EXAMPLE III 100 gram sample of high temperature, high pressure cooked, softwood spent sulfite liquor, with the reducing sugars destroyed, was treated and oxidized as in Example II. 6.5 grams of sodium hydroxide (16.2% aqueous solution) was then used to neutralize the mixture. 115.5 grams of filtrate solids were recovered as a 28% solution. 30 grams of the filtrate solids was then complexed with iron added as 20.6 grams of ferrous sulfate heptahydrate and the resulting ferro-manganese-complexed lignosulfonate was recovered by spray drying at 230° F.

The product recovered from this example was also evaluated as in the previous examples and the results are shown in Table 1.

TABLE 1

| PRODUCT | CONTROLS | | | MNO₂ PROCESS | | |
|---|---|---|---|---|---|---|
| | Chrome Lignosulfonate Reference 1 | Chrome Lignosulfonate Reference 2 | Chrome-Free Lignosulfonate Reference 3 | Product Example I | Product Example II | Product Example III |
| | INITIAL | | | | | |
| Apparent Viscosity (cps) | 48 | 26 | 28 | 21 | 22 | 22 |
| Yld. Pt. (lbs./100 sq. ft.) | 60 | 20 | 22 | 14 | 14 | 14 |
| Fann° 600 | 96 | 52 | 56 | 42 | 44 | 44 |
| 300 | 78 | 36 | 39 | 28 | 29 | 29 |
| 3 | 48 | 15 | 17 | 6 | 5 | 5 |
| 10 Min. Gel. | 55 | 105 | 100 | 85 | 97 | 88 |
| | HOT ROLLED 150° F., 16 hrs. | | | | | |
| Apparent Viscosity (cps) | 58 | 29 | 36 | 23 | 21 | 20 |
| Yld. Pt. (lbs./100 sq. ft.) | 73 | 19 | 33 | 13 | 9 | 10 |
| Fann° 600 | 115 | 57 | 71 | 45 | 41 | 40 |
| 300 | 94 | 38 | 52 | 29 | 25 | 25 |
| 3 | 55 | 7 | 26 | 5 | 3 | 3 |
| 10 Min. Gel | 56 | 33 | 52 | 22 | 20 | 22 |

Reference 1: contains 3.4% chromium.
Reference 2: contains 4.0% chromium.
Reference 3: commercial chromium-free iron complexed lignosulfonate.

EXAMPLE IV

In this example, hardwood calcium spent sulfite liquor was the starting lignosulfonate.

100 grams of solids of high temperature treated, low reducing sugar hardwood spent sulfite liquor as a 40% aqueous solution was heated to 30° C. and 22 grams of 100% sulfuric acid was added as a 30% solution in water. The reaction mixture was then oxidized by adding 20 grams of manganese dioxide as a 35% slurry in water. The exothermic oxidation reaction was allowed to proceed without cooling until the reaction temperature reached 45° C. Thereafter, 2.8 grams of sodium hydroxide as a 10% aqueous solution was added to the reaction mixture to bring its pH up to 3.6 and the mixture was filtered to remove the precipitated calcium sulfate. 114.4 grams of filtrate solids was recovered at 28.5% aqueous solution. 104.9 grams of the filtrate (containing 30 grams of solids) was then reacted with 20.6 grams of ferrous sulfate heptahydrate at 60° C. for 30 minutes and the mixture was spray dried at 230° F. to recover the solid ferro-manganese-complexed lignosulfonate.

The product of this example was tested as in Example I and the results are shown in Table 2 below.

EXAMPLE V

Ultrafiltered/diafiltered purified hardwood calcium spent sulfite liquor having an estimated purity of 96% was the starting lignosulfonate in this example.

150 grams of this material as 19.6% solution was heated to 60° C. and 30 grams of sulfuric acid was added thereto and reacted at 90° C. for 1 hour. The resulting mixture was then cooled to 60° C. and 24 grams of manganese dioxide was added as a 30% slurry in water over a period of 15 minutes. The exothermic reaction mixture was allowed to proceed without cooling, and upon the completion of oxidation the temperature of the mixture was 65° C. and its pH was 1.9. Thereafter, 5.1 grams of sodium hydroxide (16.9% aqueous solution) was added to the mixture to raise its pH to 3.6 and the reaction mass was filtered to remove the calcium sulfate precipitate and 175 grams of the solids in the filtrate as a 16.4% solution was recovered. 30 grams of the filtrate solids was reacted with 20.6 grams of ferrous sulfate at 60° C. for 30 minutes and spray dried at 230° F.

The solids recovered (ferro-manganese lignosulfonates) were evaluated as in the previous examples and their results are shown in Table 2.

It must be noted that in this example the manganese lignosulfonate was not complexed with iron or any other heavy metal cation. The rheological properties of this product were nevertheless better than intermediate quality chromium lignosulfonates which are presently used as drilling fluid additives.

TABLE 3

| PRODUCT | Control Chrome Lignosulfonate Reference 1 | Product Example VI |
|---|---|---|
| INITIAL | | |
| Apparent Viscosity (cps) | 50 | 26 |
| Yld. Pt. (lbs./100 sq. ft.) | 60 | 15 |
| Fann° 600 | 100 | 51 |
| 300 | 80 | 33 |
| 3 | 47 | 10 |
| 10 Min. Gel (lbs./100 sq. ft.) | 70 | 77 |
| HOT ROLLED, 150° F. 16 hrs. | | |
| Apparent Viscosity (cps) | 48 | 38 |
| Yld. Pt. (lbs. 100 sq. ft.) | 60 | 40 |
| Fann°600 | 96 | 76 |
| 300 | 78 | 58 |
| 3 | 46 | 35 |
| 10 Min. Gel (lbs./100 sq. ft.) | 50 | 43 |

Thus, as it is evident from the comparative rheological properties set forth in the foregoing tables, the man-

TABLE 2

| | CONTROLS | | | MNO₂ CFL | |
|---|---|---|---|---|---|
| PRODUCT | Chrome Lignosulfonate Reference 1 | Chrome Lignosulfonate Reference 2 | Chrome-Free Lignosulfonate Reference 3 | Product Example IV | Product Example V |
| INITIAL | | | | | |
| Apparent Viscosity (cps) | 48 | 26 | 28 | 27 | 23 |
| Yld. Pt. (lbs./100 sq. ft.) | 60 | 20 | 22 | 25 | 13 |
| Fann° 600 | 96 | 52 | 56 | 53 | 45 |
| 300 | 78 | 36 | 39 | 39 | 29 |
| 3 | 48 | 15 | 17 | 20 | 7 |
| 10 Min. Gel | 55 | 105 | 100 | 82 | 95 |
| HOT ROLLED 150° F., 16 hrs. | | | | | |
| Apparent Viscosity (cps) | 58 | 29 | 36 | 28 | 22 |
| Yld. Pt. (lbs./100 sq. ft.) | 73 | 19 | 33 | 21 | 12 |
| Fann° 600 | 115 | 57 | 71 | 55 | 44 |
| 300 | 94 | 38 | 52 | 38 | 28 |
| 3 | 55 | 7 | 26 | 15 | 5 |
| 10 Min. Gel | 56 | 33 | 52 | 39 | 33 |

Reference 1, 2 and 3 were the same as in Table 1.

EXAMPLE VI

In this example the starting material was Norlig 91 softwood spent sulfite liquor in 35 aqueous solution. Norlig 91 is a trademark designation for yeast fermented softwood spent sulfite liquor available from the American Can Company.

100 grams of the starting lignosulfonate was heated to 50° C. and 30 grams of sulfuric acid (38% aqueous solution) was added thereto. The mixture was agitated at 52° C. for 15 minutes and 20 grams of manganese oxide (35% slurry in water) was then added thereto over a 30-minute period. The reaction mixture was cooled to maintain the temperature below 60° C. Thereafter, 8 grams of sodium hydroxide was added to neutralize the pH of the mixture to 3.4 and the mixture filtered to remove the calcium sulfate precipitate. 144.5 grams of filtrate solids was recovered (28% solution) which was spray dried at 230° F. inlet temperature.

The material recovered in this example was manganese lignosulfonate and was evaluated as in Example I. The results are shown in Table 3.

ganese dioxide oxidized lignosulfonates are more efficient fluid drilling additives than those which are presently used. In addition, as it was previously stated, unlike the chromium lignosulfonates, the products of this invention are not environmentally objectionable and, therefore, are better suited as additives for drilling fluids.

Additional tests were conducted using the products of Examples I and II in sodium bentonite clay. The clay system in this test was 29% sodium bentonite (aquagel) in deionized water. The clay was sheared at 1700 rpm, aged at least 2 days, remixed at 2800 rpm for 10 minutes and then placed in 350 cc Jars.

The test procedure for each Jar was as follows:

(1) Mix at 2800 rpm for 10 minutes using Hamilton Beach 75 V mixer.

(2) Dose lignosulfonate product, 5 grams per Jar.

(3) Adjust the pH to 9.5–10.0, then mix for 20 minutes.

(4) Age overnight at 85°–90° C. for 16 hours (Static).

(5) Cool and adjust the pH to 10.0 while stirring for 15 minutes.

(6) Determine rheological properties including 10 minutes gel strength using Fann Viscometer).
(7) Contaminate with 5.25 grams sodium chloride.
(8) Adjust pH to 10.0 while stirring for 15 minutes.
(9) Age overnight at 85°–90° C. (Static).
(10) Repeat steps 5–6.

The rheological properties of the products of Examples I and II were then compared with the corresponding properties of chromium lignosulfonate containing 4.0% chromium (Reference 1) and commercial chromium-free iron complexed lignosulfonate (Reference 2).

The results were shown in Table 5.

TABLE 5

| PRODUCT | CONTROLS | | MNO₂ CFL | |
|---|---|---|---|---|
| | Chrome Lignosulfonate Reference 1 | Chrome-Free Lignosulfonate Reference 2 | Product Example I | Product Example II |
| INITIAL HEAT TREATED (85° C., 16 hrs.) | | | | |
| Apparent Viscosity (cps) | 56 | 56 | 43 | 39 |
| Yld. Pt. (lbs./100 sq. ft.) | 29 | 24 | 9 | 10 |
| Fann° 600 | 111 | 112 | 85 | 78 |
| 300 | 70 | 68 | 47 | 44 |
| 3 | 3 | 4 | 1 | 1 |
| 10 Min. Gel. (lbs./100 sq. ft.) | — | 6 | 3 | — |
| CONTAMINATED HEAT TREATED (85° C., 16 hrs.) | | | | |
| Apparent Viscosity (cps) | 106 | 63 | 49 | 43 |
| Yld. Pt. (lbs./100 sq. ft.) | 44 | 27 | 9 | 5 |
| Fann° 600 | 212 | 125 | 97 | 85 |
| 300 | 128 | 76 | 53 | 45 |
| 3 | 3 | 4 | 2 | 1 |
| 10 Min. Gel (lbs./100 sq. ft.) | 7 | 10 | 4 | 3 |

As shown in Table 5, the rheological properties of the products of Examples I and II are superior than the reference samples (chromium lignosulfonate and chromium-free iron complexed lignosulfonate) when tested in sodium bentonite clay.

I claim:

1. An oil well drilling fluid additive comprising the oxidation product of a sulfonated lignin-containing material and manganese dioxide and having an equivalent manganese content of about 2 to about 15 percent.

2. An additive as in claim 1 wherein said manganese content is from about 4 to about 12 percent.

3. An oil well drilling additive comprising the oxidation product of a sulfonated lignin-containing material and manganese dioxide having an equivalent manganese content of about 2 to about 15 percent, and wherein said oxidation product is complexed with a heavy metal cation.

4. An additive as in claim 3 wherein said heavy metal cation is selected from the group consisting of iron, copper, aluminum, magnesium, zinc, zirconium, or mixture thereof.

5. An additive as in claim 4 wherein said heavy metal cation is iron.

6. An additive as in claim 4 wherein said heavy metal cation is copper.

7. An additive as in claim 5 wherein the amount of complexed iron is from about 5 to about 15 percent.

8. An additive as in claim 5 wherein the amount of complexed iron is from about 5 to about 15 percent.

9. A process of preparing sulfonated lignin-manganese complex which comprises oxidizing a sulfonated lignin-containing material with from about 3 to about 30 weight percent manganese dioxide based on said solids content of the sulfonated lignin-containing material, at a temperature of from about 0° C. to about 80° C., under highly acidic conditions using a mineral acid and recovering the sulfonated lignin-manganese complex from the resulting mixture.

10. A process as in claim 9 wherein said mineral acid is sulfuric acid.

11. A process as in claim 10 wherein the amount of manganese dioxide is from about 8 to about 20 percent based on the solids content of the sulfonated lignin.

12. A process as in claim 10 further comprising the steps of adding a base to the reaction mixture to adjust the pH of said mixture to about 3.0 to 4.5 and removing the resulting calcium sulfate precipitate from said mixture.

13. A process as in claim 11 further comprising the steps of adding a base to the reaction mixture to adjust the pH of said mixture to about 3.0 to 4.5 and removing the resulting calcium sulfate precipitate from said mixture.

14. A process as in claim 12 wherein said base is sodium hydroxide.

15. A process as in claim 12 wherein said base is potassium hydroxide.

16. A process as in claim 13 wherein said base is sodium hydroxide.

17. A process in claim 13 wherein said base is potassium hydroxide.

18. A process of preparing sulfonated lignin-manganese-heavy metal cation complex which comprises:
(a) oxidizing a sulfonated lignin-containing material with from about 3 to about 30 weight percent manganese dioxide based on said sulfonated lignin-containing material, at a temperature of from about 0° C. to about 80° C., under highly acidic conditions using a mineral acid, thereby making sulfonated lignin-manganese complex,
(b) adding a compound of a heavy metal cation to said sulfonated-manganese complex to make sulfonated lignin-manganese-heavy metal cation complex, and
(c) recovering said sulfonated lignin-manganese-heavy metal cation complex from the resulting mixture.

19. A process as in claim 18 wherein said heavy metal cation is iron.

20. A process as in claim 18 wherein said heavy metal cation is copper.

21. A process as in claim 18 wherein said mineral acid is sulfuric acid and further comprising the steps of adding a base to the resulting mixture from step (a) to raise the pH of said mixture to about 3.0 to 4.5 and removing the resulting precipitated calcium sulfate prior to complexing the heavy metal cation.

22. A process as in claim 21 wherein said base is sodium hydroxide.

23. A process as in claim 21 wherein said base is potassium hydroxide.

24. A process as in claim 19 wherein said iron is added as iron sulfate.

25. A process as in claim 24 wherein said iron sulfate is added in an amount between about 5 and about 15 percent iron equivalent based on the final product.

26. A process as in claim 19 wherein said iron is added as iron-sulfate heptahydrate.

27. A process as in claim 26 wherein said iron sulfate heptahydrate is added in an amount between about 5 and about 15 percent iron equivalent based on the final product.

* * * * *